United States Patent
DeFelice et al.

(10) Patent No.: US 11,067,176 B2
(45) Date of Patent: Jul. 20, 2021

(54) CRANK PIN CONFIGURATION FOR BUTTERFLY VALVE

(71) Applicant: Hamilton Sundstrand Corporation, Charlotte, NC (US)

(72) Inventors: Robert DeFelice, South Windsor, CT (US); David J. Zawilinski, West Granby, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/722,263

(22) Filed: Dec. 20, 2019

(65) Prior Publication Data

US 2021/0190210 A1  Jun. 24, 2021

(51) Int. Cl.
  *F16K 1/22*  (2006.01)
  *F16K 31/52*  (2006.01)
  *F16K 31/528*  (2006.01)

(52) U.S. Cl.
  CPC ............ *F16K 1/221* (2013.01); *F16K 31/528* (2013.01); *F16K 31/5282* (2013.01)

(58) Field of Classification Search
  CPC ........ F16K 1/221; F16K 1/224; F16K 31/528; F16K 31/521; F16K 31/5282
  See application file for complete search history.

(56) References Cited

U.S. PATENT DOCUMENTS

| | | | |
|---|---|---|---|
| 3,184,214 A * | 5/1965 | King | F16K 31/5284 251/229 |
| 3,642,024 A | 2/1972 | La Coste et al. | |
| 3,701,632 A * | 10/1972 | Reese | G01N 27/49 436/151 |
| 5,743,512 A | 4/1998 | Greenberg | |
| 6,247,883 B1 * | 6/2001 | Monserratt | F16B 13/045 411/34 |
| 8,752,809 B2 | 6/2014 | Dalluge et al. | |
| 9,057,445 B2 | 6/2015 | Sisk | |
| 9,587,565 B2 | 3/2017 | Streutker et al. | |
| 2011/0214288 A1 * | 9/2011 | Dalluge | F16K 27/0218 29/890.124 |
| 2017/0082206 A1 | 3/2017 | Thiessen et al. | |
| 2017/0370181 A1 * | 12/2017 | Savalia | F16K 1/224 |

(Continued)

FOREIGN PATENT DOCUMENTS

| | | |
|---|---|---|
| CA | 2964618 A1 | 10/2018 |
| GB | 515808 A | 12/1939 |

OTHER PUBLICATIONS

European Search Report for European Application No. 20215741.8 dated May 4, 2021.

*Primary Examiner* — Kelsey E Cary
(74) *Attorney, Agent, or Firm* — Carlson, Gaskey & Olds, P.C.

(57) ABSTRACT

A torque transfer arrangement for a butterfly valve includes a crank having a tubular portion with an outer radial surface and an inner radial surface defining a cylindrical bore about a first axis. The tubular portion has two openings connecting the outer surface with the inner surface. A shaft is sized and configured to fit within the cylindrical bore and aligned with the first axis. A hole formed therethrough is substantially perpendicular to the first axis. A tapered pin is sized and configured to snuggly engage within the two openings and the hole. A butterfly valve and method are also disclosed.

17 Claims, 1 Drawing Sheet

(56) References Cited

U.S. PATENT DOCUMENTS

2018/0306333 A1* 10/2018 Robinson .............. F16K 5/0647
2019/0162315 A1    5/2019 Matsumura et al.
2020/0049079 A1*  2/2020 Lee, II ................. F02D 9/1065
2020/0369083 A1* 11/2020 Stoehr ................ B60B 33/0042

* cited by examiner

CRANK PIN CONFIGURATION FOR BUTTERFLY VALVE

BACKGROUND

This application relates to the connection of a crank to a shaft for driving a butterfly valve.

Butterfly valves are known and typically include a valve member controlling the flow of a fluid through a fluid conduit. The butterfly valve is rotated about an axis between fully open and fully closed positions.

Generally, it has been known to have the butterfly valve rotate with a shaft and to rotate the shaft with a crank. The crank is driven by an actuator associated with a control. The actuator moves the crank to change the position of the butterfly valve to, in turn, control the flow of fluid to the conduit.

Historically, a straight pin has been utilized to secure the crank to the actuation shaft. There has been clearance between an outer periphery of the pin and an inner periphery of a bore in the actuation shaft and crank receiving the pin. This has led to undesirable chatter.

SUMMARY

A torque transfer arrangement for a butterfly valve includes a crank having a tubular portion with an outer radial surface and an inner radial surface defining a cylindrical bore about a first axis. The tubular portion has two openings connecting the outer surface with the inner surface. A shaft is sized and configured to fit within the cylindrical bore and aligned with the first axis. A hole formed therethrough is substantially perpendicular to the first axis. A tapered pin is sized and configured to snuggly engage within the two openings and the hole.

A butterfly valve and method are also disclosed

These and other features may be best understood from the following drawings and specification.

DETAILED DESCRIPTION

Figure 1:
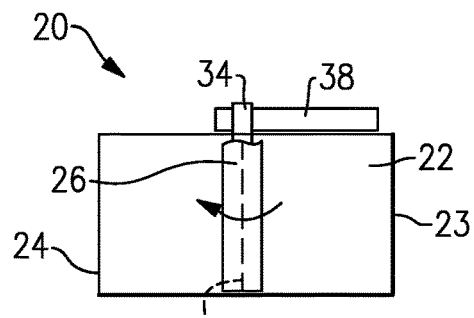
FIG. 1 shows a butterfly valve assembly.

FIG. 1 discloses a butterfly valve and fluid flow system 20. A conduit 22 extends from inlet 23 to an outlet 24. A fluid selectively flows through the conduit 22. A butterfly valve 26 can selectively block, or allow, full flow, and can be modulated between the two extremes. Generally, an actuation or crank assembly 28 rotates the butterfly valve 26 about an actuation axis X defined by an actuation shaft 34, as described below.

Figure 2:
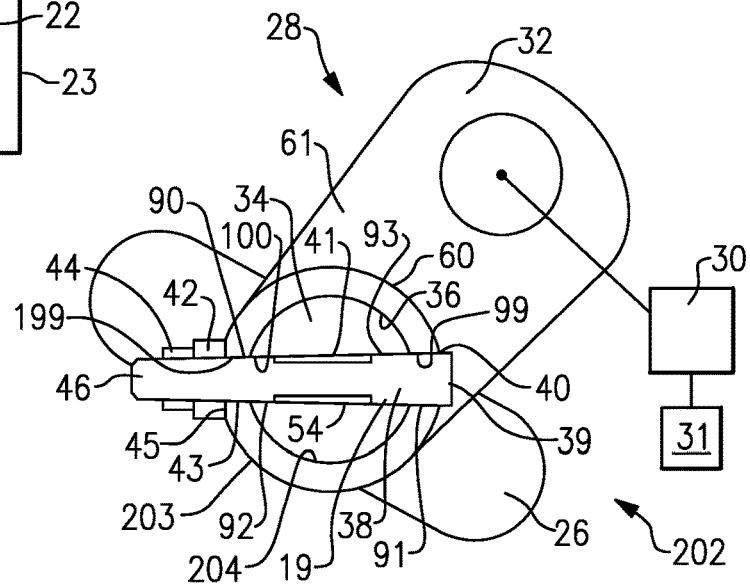
FIG. 2 shows an actuation structure for the FIG. 1 butterfly valve.

FIG. 2 shows crank assembly 28 according to this disclosure. An actuator 30 is under the control of a control 31 to pivot crank 32. As crank 32 pivots, it rotates actuation shaft 34. Actuation shaft 34 is received in a cylindrical bore 36 of the crank 32. Cylindrical bore 36 is formed in a boss 60 extending outwardly of a nominal surface 61 of crank 32.

As the actuation shaft 34 rotates, the butterfly valve 26 itself will rotate, to control the flow of fluid through the conduit 22. As mentioned above, in the past, a straight pin has been utilized to secure the actuation shaft 34 to the crank 30, resulting in undesirable clearance.

In this disclosure, a tapered pin 38 is utilized to secure actuation shaft 34 to crank 32. Tapered pin 38 generally has an outer surface 19 which decreases in diameter from an outer or first end 39 to an inner of second end 46. First end 39 is received within a first opening 40 in the crank boss 60. Inner end 44 extends through a second opening 43 in the crank boss 60.

The pin also passes through an actuation shaft hole 54 in the actuation shaft 34. A spacer 42 is placed on the tapered pin 38 outward of second opening 43. Spacer 42 is generally cylindrical and sits against the flat surface 45 on boss 60. A nut 44 is torqued onto a threaded end on threads at the inner end 46 of the tapered pin 39.

Thus, when assembling actuator 28, the tapered pin 38 extends through openings 40/43 and hole 54, and is then pulled to the left, as shown in FIG. 2, by tightening of the nut 44. The tapered outer surface 19 is thus drawn into the openings 40, 43 and hole 54 ensuring tight contact at areas 90 and 91 between the tapered pin 38 and inner surfaces 99 and 199 of the openings 40 and 43, respectively, and areas 92 and 93 between an outer periphery of the tapered pin 38 and an inner surface 100 of the hole 54.

As can be appreciated in FIG. 2, the tapered pin has a reduced outer diameter portion 41, which is not in contact with hole 54. This reduces the torque load and concentrates the holding force at areas 90/91/92 and 93.

A torque transfer arrangement 202 for a butterfly valve could be said to include crank 32, shaft 34 and tapered pin 38.

Figure 3:
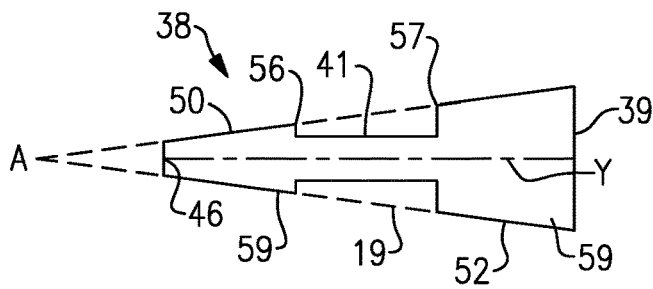
FIG. 3 shows a tapered pin for securing a crank to an actuation shaft in the FIG. 1 butterfly valve.

As shown in FIG. 3, the tapered pin 38 thus has an outer peripheral portion 50 extending from end 46 to an end 56. Further, another outer peripheral portion 52 extends from an end 57 to the outer end 39. Portions 50 and 52 generally increase at a constant angle A measured about a center axis Y of the tapered pin 38. As can be appreciated from this figure, the reduced diameter portion 41 does not extend along the angle A. By reducing contact through the middle of the bore 54, the tapered pin 38 provides better load carrying capability at the areas 90, 91, 92 and 93.

In fact, it can be shown that the use of the reduced diameter portion 54 dramatically increases the load carrying capability over a standard tapered pin.

In designing the relative length of the reduced diameter portion 54 relative to the overall length of the tapered pin 38, it is desirable to create equal contact areas on surfaces 90, 91, 92 and 93. The length of the reduced diameter portion may be a result of that effort, and the wall thickness of the boss.

In addition, a dry film lubricant may be applied to the outer diameter of the tapered pin 30 to assist in it being drawn into the several bores.

A butterfly valve assembly under this disclosure could be said to include a butterfly valve mounted on an actuation shaft and within a conduit to selectively control the flow of a fluid between a conduit inlet and a conduit outlet. The actuation shaft being rotatable by a crank assembly to, in turn, rotate the butterfly valve. The crank assembly includes an actuator for pivoting a crank shaft. The crank shaft being fixed to the actuation shaft by a tapered pin to cause resultant rotation of the actuation shaft when the crank is pivoted by the actuator. The crank having a cylindrical bore receiving the actuation shaft. The crank having a first opening extending into the cylindrical bore, and a second opening at a remote side of the cylindrical bore, and the actuation shaft having an actuation shaft bore. The tapered pin received in the first and second openings and in the actuation shaft bore, and having an outer surface of a diameter that decreases between a first end of said tapered pin received in the first opening of the crank to a second end of the tapered pin received in the second opening of the crank. A nut is received on the tapered pin on a remote side of the cylindrical bore relative to the second opening in the crank.

A torque transfer arrangement 202 for a butterfly valve under this disclosure could be said to include a crank 32 having a tubular portion with an outer radial surface 203 and an inner radial surface 204 defining a cylindrical bore about a first axis Z. The tubular portion has two openings 90/91 connecting the outer surface with the inner surface. A shaft 34 is sized and configured to fit within the cylindrical bore and aligned with the first axis. A hole 54 formed therethrough is substantially perpendicular to the first axis. A tapered pin 38 is sized and configured to snuggly engage within the two openings and the hole.

Figure 4A:
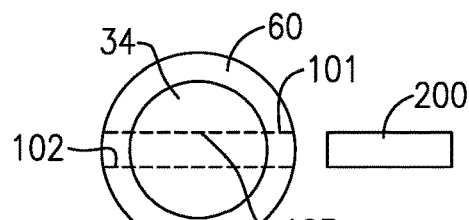
FIG. 4A shows a first step in a method of forming an actuation structure.
Figure 4B:
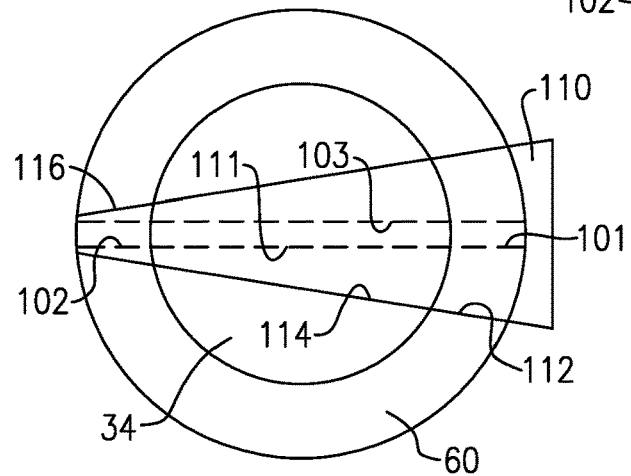
FIG. 4B shows a subsequent step.

A method of forming openings 40, 43 and hole 54 is illustrated in FIGS. 4A and 4B. In a first step shown in FIG. 4A, a drill 200 drills cylindrical holes 101 and 102 in the boss 60, and at the same time drills a cylindrical hole 103 through the actuation shaft 34.

In a second step illustrated in FIG. 4B, a tapered reamer 110 is then inserted into the hole 101 and driven toward the hole 103. The surface 112 corresponds to the opening 40. The surface 114 corresponds to the hole 54. The tapered hole 116 corresponds to the opening 43.

Thus, the opening 40 has a greater inner diameter than the opening 41. That is, opening 40 is larger than opening 41. The hole 54 has a tapered decreasing diameter from a portion adjacent the opening 40 and moving toward the opening 43. The extent of the taper may be selected to generally match the taper of the tapered pin 38.

However it should be understood that the angle A as shown in FIG. 3, and the extent of the taper as shown in FIG. 4B may be somewhat exaggerated to illustrate the fact of the taper.

A method of forming an actuation structure under this disclosure could be said to include the steps of: 1) placing an actuation shaft into a boss that defines a bore in a crank shaft; 2) drilling a first cylindrical hole in a first side of the boss, through the actuation shaft to form a cylindrical hole, and through an opposed second side of the boss to form a second opening; and 3) then utilizing a tapered reamer to form the first opening to be larger than the second, and further to form the cylindrical hole in the actuation shaft to be tapered, and smaller in a direction from the first side of the boss towards the second side of the boss.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A torque transfer arrangement for a butterfly valve comprising:
   a crank having a tubular portion with an outer radial surface and an inner radial surface defining a cylindrical bore about a first axis, the tubular portion having two openings connecting the outer surface with the inner surface;
   a shaft sized and configured to fit within the cylindrical bore and aligned with the first axis, and having a hole formed therethrough that is substantially perpendicular to the first axis;
   a tapered pin sized and configured to engage within the two openings and the hole; and
   wherein there is a reduced diameter portion on a tapered pin outer surface intermediate first and second portions, said reduced diameter portion received within said hole.

2. The arrangement as set forth in claim 1, wherein an outer diameter of said tapered pin decreasing at an angle between a first end and a second end.

3. The arrangement as set forth in claim 2, wherein said tapered pin being in contact with an inner surface of said shaft defining said hole at a pair of areas on opposed sides of said reduced diameter portion.

4. The arrangement as set forth in claim 3, wherein said tapered pin being in contact with an inner surface of each of said two openings.

5. The arrangement as set forth in claim 4, wherein said tubular portion is a boss extending outwardly of a nominal surface of said crank.

6. The arrangement as set forth in claim 1, wherein said tapered pin has a dry film lubricant on an outer surface.

7. The arrangement as set forth in claim 1, wherein said tubular portion is a boss extending outwardly of a nominal surface of said crank.

8. The arrangement as set forth in claim 1, wherein said tapered pin being in contact with an inner surface of said shaft defining said hole at a pair of areas on opposed sides of said reduced diameter portion.

9. The arrangement as set forth in claim 8, wherein said tapered pin being in contact with an inner surface of each said two openings.

10. The arrangement as set forth in claim 1, wherein a first of said two openings is larger than a second of said two openings.

11. The arrangement as set forth in claim 10, wherein said tapered pin extends outwardly of said second of said two openings, and a nut is received on said tapered pin at a location outwardly of said second opening.

12. A butterfly valve assembly comprising:
   a butterfly valve mounted on a shaft and within a conduit; and
   a torque transfer arrangement for said butterfly valve including a crank having a tubular portion with an outer radial surface and an inner radial surface defining a cylindrical bore about a first axis, the tubular portion having two openings connecting the outer surface with the inner surface;
   said shaft sized and configured to fit within the cylindrical bore and aligned with the first axis, and having a hole formed therethrough that is substantially perpendicular to the first axis;
   a tapered pin sized and configured to engage within the two openings and the hole; and
   wherein there is a reduced diameter portion on a tapered pin outer surface intermediate first and second portions, said reduced diameter portion received within said hole.

13. The butterfly valve assembly as set forth in claim 12, wherein an outer diameter of said tapered pin decreasing at an angle between a first end and a second end.

14. The butterfly valve assembly as set forth in claim 13, wherein said tapered pin being in contact with an inner surface of said shaft defining said hole at a pair of areas on opposed sides of said reduced diameter portion.

15. The butterfly valve assembly as set forth in claim 12, wherein a first of said two openings is larger than a second of said two openings.

16. The butterfly valve assembly as set forth in claim 15, wherein said tapered pin extends outwardly of said second of said two openings, and a nut is received on said tapered pin at a location outwardly of said second opening.

17. The butterfly valve assembly as set forth in claim 12, wherein said tapered pin being in contact with an inner surface of said shaft defining said hole at a pair of areas on opposed sides of said reduced diameter portion.

* * * * *